Patented Jan. 3, 1950

2,493,732

UNITED STATES PATENT OFFICE 2,493,732

STABILIZED CHOCOLATE SIRUP AND BEVERAGE

Barron S. Whittingham, New York, N. Y., assignor of thirty-three and one-third per cent to Julian S. Colyer and thirty-three and one-third per cent to Jerome N. Wanshel No Drawing. Application November 2, 1946, Serial No. 707,539

9 Claims. (Cl. 99—25)

This invention relates to a cholocate syrup which will form a stabilized emulsion in an aqueous medium and to the beverage formed thereby.

Chocolate syrups and chocolate beverages have been known heretofore but they have all suffered from the common disadvantage that the syrups would, when mixed with an aqueous medium such as carbonated water to form a beverage, form a suspension in said aqueous medium, the chocolate particles taking the form of granules noticeable to the eye and to the taste which tend to precipitate from the aqueous medium upon standing for even a short period of time. When such syrups have been used in the formation of soda fountain chocolate sodas, the chocolate grains have also exhibited the tendency of concentrating in the foam which forms on the top of such sodas, thus giving rise to a distinctly disagreeable taste. The commercial bottling of chocolate sodas has been markedly deterred by the disinclination of the public to accept a bottled beverage the chocolate portion of which settles to the bottom and which therefore requires considerable shaking before the beverage can be drunk. Not only do the taste and appearance of such beverages mitigate against their ready acceptance by the public but the shaking of a carbonated beverage will result in a release of carbonation which, if the shaking be carried out while the bottle is stoppered, as it must be, will result when the stopper is removed in an exceedingly undesirable spurting of a considerable portion of the beverage from the bottle. Still other problems have arisen from the non-homogeneous miscibility of chocolate preparations with edibles such as ice cream, these difficulties giving rise to complicated and consequently expensive methods of manufacture.

I have produced a chocolate syrup which overcomes these difficulties. My chocolate preparation is miscible in aqueous media such as milk or carbonated water in all proportions to form a beverage which is homogeneous throughout its mass and from which the chocolate will not settle or precipitate even if the beverage be refrigerated. The granular appearance and taste of prior chocolate beverages and the concentration of the chocolate particles in the foam thereof is therefore completely eliminated. Moreover, my chocolate preparation may be prepared in a simple manner and without the use of complicated and expensive equipment and may be mixed with the aqueous medium in ordinary fashion, and without the necessity of homogenization or other similar complicated mixing methods.

My chocolate preparation may be used by itself as a syrup or flavoring agent for various dishes, such as cakes and sundaes, or it may be mixed with any suitable aqueous medium such as carbonated water to form a beverage capable of being bottled on a mass production scale and distributed and sold without any special precautions being necessary for its preservation, the beverage retaining its homogeneity despite the treatment to which it may be subjected.

To the accomplishment of the foregoing results my invention relates to a chocolate preparation, to the beverage which employs that preparation, and to the method of making that preparation as set forth in this specification and as defined in the appended claims.

The term "cocoa" is used in this specification in its commercial sense. It encompasses a multitude of types of natural chocolate from which various proportions of the fat content have been removed. Since commercial cocoas differ from one another both in acidity, in fat content, and in various physical and chemical respects, and since my improved preparation can be made from any or all of these cocoas, its preparation and composition will hereinafter be described with that factor in mind.

The basic factor in the preparation of my cocoa composition, as it will be termed, resides in the treatment of any commercial type of cocoa with an edible fat, and preferably one containing the stearyl radical $(CH_3(CH_2)_{16}CO-)$, in a water solution the pH of which is suitably controlled and to which a dispersoid is added. The cocoa composition which results is in the form of an aqueous emulsion, the density, viscosity and sweetness of which may be varied at will, the emulsion being miscible in all proportions with an aqueous medium to form an emulsion which is stable, that is to say, from which the cocoa composition will not precipitate. In the formation of this cocoa composition, the proportions of the edible fat and the dispersoid and the water which forms the dispersion medium may all be varied within wide degrees depending upon the desired taste and physical characteristics of the resultant product.

The edible fat which I find it most convenient to use is hydroxy stearic acid. This compound is known to exist in ten forms or homologs (Heilbron, 1936). Of these forms, best results are apparently obtained when 10- or 11-hydroxy stearic acids are employed, but adequate results have been obtained using the other homologs. In addition, cocoa-butter, which consists principally of oleopalmitostearins, has also been employed, this vegetable fat having an acid value of from 1.1 to 1.9 (Handbook of Chemistry, Lange, 1944, p. 679). It will be noted that all of these fats are characterized by containing the stearyl radical.

As a dispersoid I have used citrus pectin with great success, although other pectins have also been used.

The choice of the above substances and of the other substances employed in the preparation of this product have been limited not only by chemical considerations but also by the requirements of the various statutes and regulations concerning the composition of edible products. As new edible fats and dispersoids which meet legal requirements become available, they may of course be used in the preparation of my product provided the other requirements of the preparation process be fulfilled.

My cocoa preparation may be made in the following manner: A suitable amount of edible fat containing the stearyl radical is melted, water being added either before or after the melting, in the presence of a desired amount of cocoa and enough acid to bring the pH of the mixture preferably to between 3.2 and 5. A pH value of 3 represents the maximum desired acidity. This mixture is brought to a boil and is vigorously stirred, the stirring preferably continuing throughout the subsequent steps. As a result of this step, the cocoa particles and the carboxylic acid become intimately associated. The mixture is permitted to cool to a temperature of from 45° to 70° C. and a base is then slowly added until a pH value preferably between 8 and 9 is attained. A pH of 9.5 may be taken as representative of the maximum preferable basicity. The mixture is then permitted to cool to a temperature between 30 and 45° C., at which time acid is again added to lower the pH to between 5.5 and 6.9. At this point, the dispersoid is stirred into the mixture, the dispersoid serving the function of preventing the formation, as the mixture is permitted to cool to room temperature, of a solid cake, but instead facilitating the formation of a truly stabilized emulsion.

The amount of cocoa may be varied within wide limits depending upon the degree of chocolatiness desired in the resultant mixture. The amount of water may be varied within wide limits depending upon the viscosity and degree of chocolatiness desired. The amount of dispersoid and of edible fat containing the stearyl radical may also be varied over relatively wide limits depending upon the viscosity or lack of jelliness desired. The amounts of acid and base used in the preparation of my composition will be determined by the acidity of the cocoa, the amount of water present, and the acidity of the edible fat, the acid and base being added in amounts sufficient to attain the desired pH values.

Since an edible substance is being produced, the choice of acid is limited to those which when incorporated are edible. I have found citric acid exceedingly useful but any other edible acid would serve as well. As a base I employ sodium hydroxide but any other substance which would permit the attainment of the desired pH value and which will, after entering into reaction, yield edible reaction products, may also be used.

The cocoa may be added to the mixture after the edible fat has been melted and brought to the boiling point or may be incorporated with the edible fat prior to its being heated. However, I have found that the cocoa must be added before the sodium hydroxide or other base is added.

To the cocoa preparation which results from the above process, sugar syrup or any other sweetening agent may be added to give the preparation the desired degree of sweetness and the preparation, which is in the form of an emulsion of cocoa, may then be used either as a syrup which may be poured over any other edible for flavoring purposes or as the flavoring and coloring component of a beverage. In the latter case, it may be mixed with water, carbonated water, or milk products to form a tasty beverage in which the chocolate flavoring is homogeneously taken up and from which the chocolate flavoring will not settle. The mixture therefore forms an emulsion in the beverage.

The following examples are illustrative of the proportions of components which may be employed, it being understood that those proportions are variable at will according to the criteria above set forth.

*Example I.*—To a gallon of water and one pound of cocoa are added 30 grams of hydroxy stearic acid and enough citric acid to maintain a pH between 3 and 5. The mixture is stirred vigorously and brought to a boil and the stirring continues throughout the remaining steps. The mixture is permitted to cool to a temperature of from 45 to 70° C. and sodium hydroxide is then slowly added until a pH of between 8 and 9 is attained. When the mixture cools to a temperature of between 30 and 45° C., citric acid is again added to lower the pH to between 5.5 and 6.9, at which point 30 grams of powdered citrus pectin are added. One to two ounces of this mixture to which sugar syrup has been added to the desired degree may be mixed with sufficient carbonated water to form six to twelve ounces of a palatable stabilized chocolate drink which will not precipitate when standing at room temperature or upon refrigeration.

*Example II.*—For a more chocolaty taste, 3 grams of commercial cocoa may be employed in conjunction with ½ gram of hydroxy stearic acid and ½ gram of powdered citrus pectin.

It is to be noted that the beverage which results may be carbonated to any desired degree without causing precipitation or separation of the chocolate from the aqueous medium.

It will be apparent that many departures from the specific proportions herein set forth and from the steps of preparation may be made without departing from the spirit of the invention as defined in the following claims.

I claim:

1. The method of preparing a cocoa emulsion which will form a stable emulsion in an aqueous medium consisting of the steps of mixing cocoa with an edible fat containing the stearyl radical in an aqueous medium having a pH of 3 to 5 while heating substantially to the boiling point, cooling the mixture to a temperature of 40 to 70° C., adding a base to obtain a pH of 8 to 9, cooling to a temperature of 30 to 45° C., adding an acid to obtain a pH of from 5.5 to 6.9, adding a dispersoid and cooling to room temperature.

2. The method of preparing a cocoa emulsion which will form a stable emulsion in an aqueous medium consisting of the steps of mixing cocoa with hydroxy stearic acid in an aqueous medium having a pH of 3.2 to 5 while heating substantially to the boiling point, cooling the mixture to a temperature of 40 to 70° C., adding a base to obtain a pH of 8 to 9, cooling to a temperature of 30 to 45° C., adding an acid to obtain a pH of from 5.5 to 6.9, adding powdered pectin and cooling to room temperature.

3. The method of preparing a cocoa emulsion which will form a stable emulsion in an aqueous medium consisting of the steps of mixing cocoa with 10-hydroxy stearic acid in an aqueous medium having a pH of 3.2 to 5 while heating substantially to the boiling point, cooling the mixture to a temperature of 40 to 70° C., adding a base to obtain a pH of 8 to 9, cooling to a temperature of 30 to 45° C., adding an acid to obtain a pH of from 5.5 to 6.9, adding powdered pectin and cooling to room temperature.

4. The method of preparing a cocoa emulsion which will form a stable emulsion in an aqueous medium consisting of the steps of mixing cocoa with 11-hydroxy stearic acid in an aqueous medium having a pH of 3.2 to 5 while heating substantially to the boiling point, cooling the mixture to a temperature of 40 to 70° C., adding a base to obtain a pH of 8 to 9, cooling to a temperature of 30 to 45° C., adding an acid to obtain a pH of from 5.5 to 6.9, adding powdered pectin and cooling to room temperature.

5. The method of preparing a cocoa emulsion which will form a stable emulsion in an aqueous medium consisting of the steps of mixing cocoa with cocoa-butter in an aqueous medium having a pH of 3.2 to 5 while heating substantially to the boiling point, cooling the mixture to a temperature of 40 to 70° C., adding a base to obtain a pH of 8 to 9, cooling to a temperature of 30 to 45° C., adding an acid to obtain a pH of from 5.5 to 6.9, adding powdered pectin and cooling to room temperature.

6. The method of preparing a cocoa emulsion which will form a stable emulsion in an aqueous medium consisting of the steps of mixing cocoa with hydroxy stearic acid and citric acid in an aqueous medium having a pH of 3.2 to 5 while heating substantially to the boiling point, cooling the mixture to a temperature of 40 to 70° C., adding a base to obtain a pH of 8 to 9, cooling to a temperature of 30 to 45° C., adding an acid to obtain a pH of from 5.5 to 6.9, adding powdered citrus pectin and cooling to room temperature.

7. The method of preparing a cocoa emulsion which will form a stable emulsion in an aqueous medium consisting of the steps of mixing hydroxy stearic acid and cocoa in boiling water in the presence of sufficient citric acid to give the mixture a pH of 3.2 to 5, cooling the mixture to a temperature of 40 to 70° C., adding sodium hydroxide to raise the pH to from 8 to 9, cooling to 30 to 45° C., adding citric acid to lower the pH to 5.5 to 6.9, adding powdered citrus pectin and cooling to room temperature.

8. The method of claim 7, in which the amount by weight of hydroxy stearic acid approximately equals the amount by weight of powdered pectin used.

9. The method of claim 7, in which the proportions by weight of cocoa, hydroxy stearic acid, and powdered pectin are as 6:1:1.

BARRON S. WHITTINGHAM.

REFERENCES CITED

The following references are of record in the file of this patent:

UNITED STATES PATENTS

| Number | Name | Date |
| --- | --- | --- |
| 1,617,721 | North | Feb. 15, 1927 |
| 1,993,932 | Joseph | Mar. 12, 1935 |
| 2,253,389 | Mnookin | Aug. 19, 1941 |
| 2,396,265 | Jackson | Mar. 12, 1946 |

FOREIGN PATENTS

| Number | Country | Date |
| --- | --- | --- |
| 6,073 | Great Britain | Of 1903 |